United States Patent Office 2,919,149
Patented Dec. 29, 1959

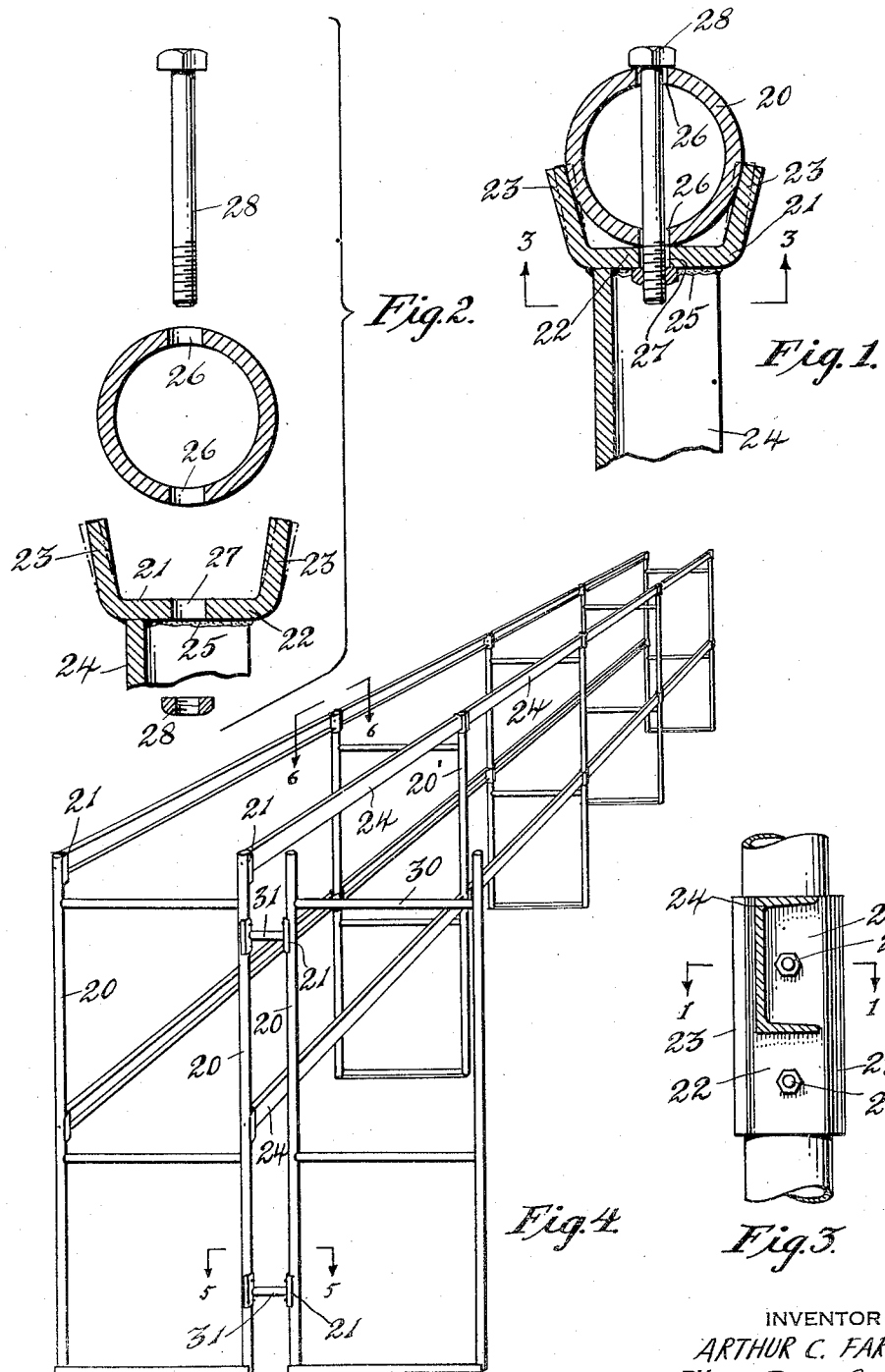

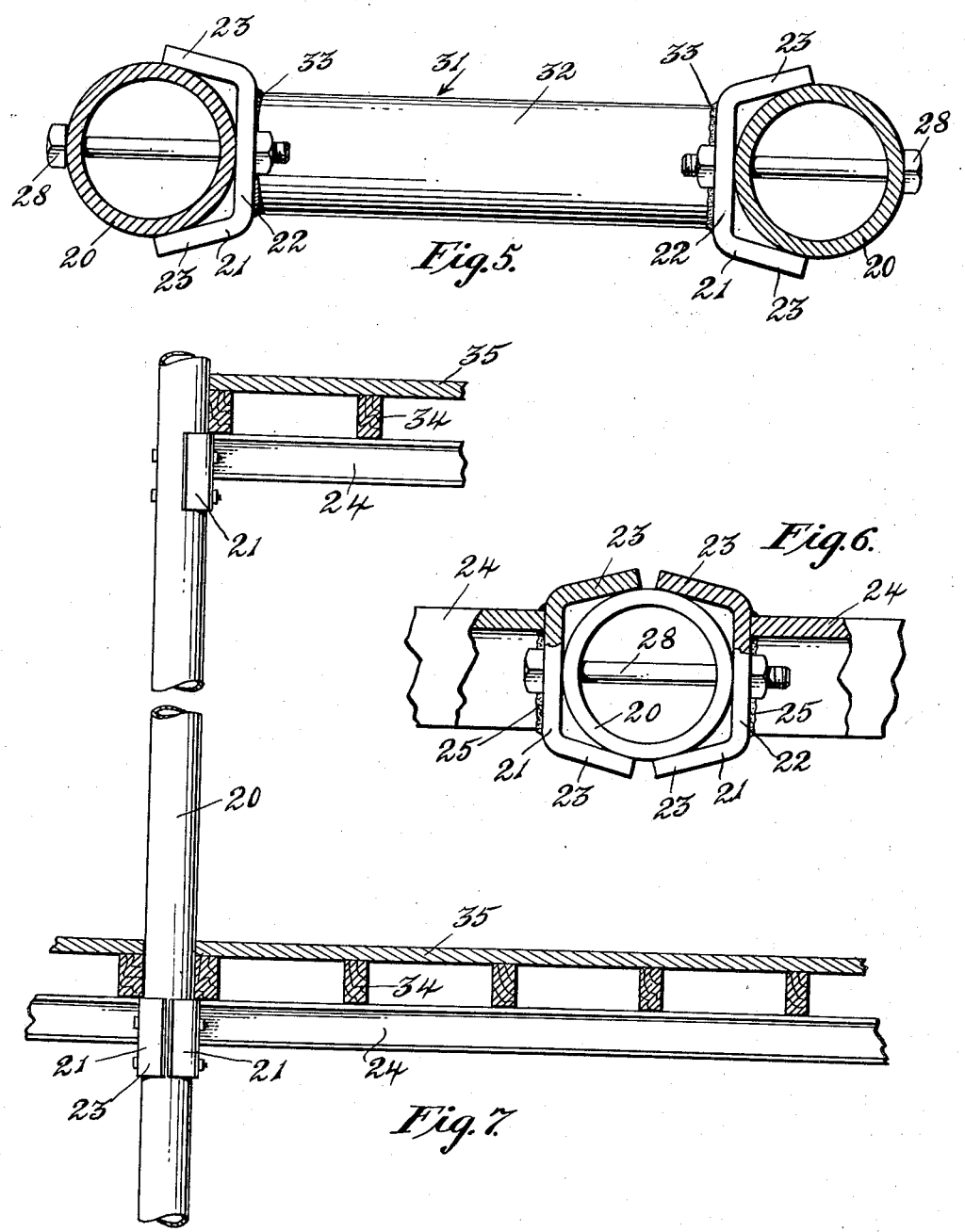

2,919,149
STRUCTURAL CONNECTION
Arthur C. Farley, Flourtown, Pa.
Application April 28, 1958, Serial No. 731,298
3 Claims. (Cl. 287—54)

The present invention relates to structural connection, as for example, those between columns and beams.

A purpose of the invention is to provide a simple, inexpensive structural connection between a member of round cross section such as a tube, and another member extending transversely thereof.

A further purpose is to avoid the necessity of precise machining of a connector while assuring accurate seating.

A further purpose is to prestress resilient yoke arms in a connector and to cause these arms to grip at the sides of a round column or the like, while desirably seating the base of the connector yoke against the column immediately between the arm engagements.

A further purpose is to produce a confining force by connector arms applied to the sides of a tubular column or the like which is opposed to the collapsing tendency caused by a bolt extending through the column.

A further purpose is to provide a radial detachable connection between structural members which at the same time supports transversely to the direction of bolting and assures tight engagement.

Further purposes appear in the specification and in the claims.

In the drawings I have chosen to illustrate a few only of the numerous embodiments in which my invention may appear, selecting the forms shown from the standpoints of convenience in illustration, satisfactory operation and clear demonstration of the principles involved.

Figure 1 is a fragmentary horizontal section of one form of structural connection according to the invention, the section being taken on the line 1—1 of Figure 3.

Figure 2 is an exploded section of the components of Figure 1.

Figure 3 is a fragmentary section on the line 3—3 of Figure 1.

Figure 4 is a fragmentary partially diagrammatic perspective showing the structural connection of the invention applied to supports for use in a warehouse or the like.

Figure 5 is an enlarged section on the line 5—5 of Figure 4.

Figure 6 is an enlarged section on the line 6—6 of Figure 4.

Figure 7 is a fragmentary side elevation partly in vertical section showing the structural connection of the invention applied in building construction.

Describing in illustration but not in limitation and referring to the drawings:

In the prior art it has been very difficult to obtain an adequately strong, conveniently assembled and disassembled structural connection between a member of circular cross section such as a tubular column, and a member transverse thereto such as a beam. As a consequence, where removable connections must be made, it has been common practice to use columns having flat sides against which a beam can abut. This is, however, unsatisfactory and expensive, and it would be desirable in many instances to use a tube, pipe or the like, especially as a column.

The present invention makes it possible to connect to an element of round exterior contours such as a round pipe or tube, without expensive precise machining on the connector, and with great rapidity and convenience. The connector is of yoke formation having diverging yoke arms and an intermediate yoke base. In fully assembled or stressed condition, the yoke arms engage opposed sides of the round member, with creation of residual stress in the yoke arms, while the base of the yoke engages an intermediate point on the side of the round member. A bolt or other fastening extends through the round member and the base of the yoke on an axis which approximately bisects the angle between yoke arms, and thus the compression force applied to the round member by the arms of the yoke exerts a collapsing tendency on the tube which is opposed by the compression force applied by the bolt.

The device of the invention may be employed to make single joints or double joints, as desired.

Considering first the form of Figures 1 to 3, I there illustrate a round structural member 20 suitably a steel tube or pipe and conveniently a column. A yoke-like connector 21 engages the side of the round member 20. The yoke-like connector has a suitably flat yoke base 22 and two yoke arms 23 which are diverging in the unstressed position and further diverging when the yoke is stressed, as later explained.

The base of the yoke forms suitably a butt joint against member 24 extending transverse to the round member 20. The member 24 may suitably be a beam and as shown in Figure 3 is a channel. The beam 24 is united to the base of the yoke on the side of the yoke remote from the round member 20 by welds 25.

The degree of divergence of the yoke arms 23 will vary in particular installations, the angle between the suitably straight yoke arms 23 varying in particular installations between a small angle such as 1 degree and an appreciable angle such as 40 degrees, but being preferably of the order of 5 to 20 degrees and most desirably of the order of 10 to 15 degrees.

The above angles apply when the arms of the yoke are unstressed, the angles suitably increasing by a few degrees when the structure is assembled and the arms are stressed.

In the form of Figures 1 to 3, the round member 20 has holes 26 extending therethrough in line with one another and in line with a hole 27 at the center of the base of the yoke, and desirably at a position to avoid interference with the beam. The number of such sets of holes will vary but as shown in Figure 3 I prefer to provide two. Bolt and nut combinations 28 extend through each set of holes and the bolts are drawn up tight until the arms 23 of the yoke are spread as indicated by the relation of the dot-and-dash line unstressed position to the solid line stressed position in Figure 1, and the relation between the solid line unstressed position and the dot-and-dash line stressed position in Figure 2. At the same time the base of the U is pulled up tight against the side of the circular member 20. In the preferred set-up the arms of the U in fully prestressed assembled condition do not extend quite to the middle of the circular cross section, but they tend to constrict the tubular element 20 and prevent it from bulging in the direction at right angles to the direction in which the tubular cross section is compressed by the bolt.

Accordingly the stiffness of the column is advantageously promoted, while at the same time a very strong, firm and tight joint has been made. The joint is strong laterally because of the arms of the yoke and is strong in the direction of the bolt because of the engagement between the base of the yoke and the side of the round member. It is strong transverse to the length of the bolt, due to the great shear strength of the bolts.

The joint of Figures 1 to 3 may be used, for example, in assembling warehousing racks or the like, as shown in Figure 4. In this figure, columns 20 are connected to beams 24 by the joint of Figures 1 to 3. Also sets of columns joined by cross connectors 30 are held together by couplers 31, best seen in Figure 5, embodying the joint of the invention. Each of the couplers has abutting the base of the yoke a coupler tube 32 welded at 33 to the base of the adjoining yoke, and otherwise making a joint with the column at each end similar to that of Figures 1 to 3.

Intermediate columns 20′, which are not at the ends of the rack, are joined to opposed aligned beams 24, as best seen in Figure 6 to make double joints, each of which is essentially like the joint of Figures 1 to 3 except that there are two yokes on opposite sides of the column 20.

It will be evident that the principles of the invention can be applied to primary building construction, as shown in Figure 7, where a building column 20, suitably a pipe, is joined to beams 24 at the floor levels by the joint of Figure 6 at the lower floor and the joint of Figure 1 at the upper floor. In each case, suitable joists 34 extend across the beams and receive flooring 35.

It will of course be evident that the structure of the invention can be produced in any suitable structural material, such as steel, aluminum base alloy, copper base alloy, magnesium base alloy, or the like as required, although it is believed that it will find its widest application where the components are all of steel.

In view of my invention and disclosure variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention, what I claim as new and desire to secure by Letters Patent is:

1. In a structural connection, a first metallic member of generally round cross section, a second member extending generally transversely to the first member, a metallic connector yoke having a generally flat base and arms of the yoke which diverge from the base, the base of the yoke being secured to one end of the second member, the arms of the yoke being disposed on opposite sides of the first member and extending longitudinally of the first member and the arms coming into engagement with the curved surface of the first member at generally opposed positions on the first member spaced by a distance less than the diameter of the first member, the yoke in relaxed position when in contact with the first member having the arms of the yoke engaging the first member and the base of the yoke spaced from the first member, the arms of the yoke in assembled position being resiliently outwardly deflected and maintaining residual stress on the first member, and the base of the yoke in assembled position being relatively closer to the side of the first member than in the relaxed position of the yoke, and tension fastening means extending through the base of the yoke and through the first member at a plurality of points distributed longitudinally of the first member and pulling the yoke toward the first member and maintaining the arms of the yoke prestressed against the first member, the compression imposed on the first member by the tension of said fastening means being generally at right angles to the compression imposed on the first member by the arms of the yoke.

2. A connection of claim 1, in which in assembled position the base of the yoke engages the side of the first member.

3. A connection of claim 1, in which the first member is a metallic tube.

References Cited in the file of this patent

UNITED STATES PATENTS

| | | |
|---|---|---|
| 900,545 | Humiston | Oct. 6, 1908 |
| 1,099,764 | Polansky | June 9, 1914 |
| 1,136,010 | Hendricks et al. | Apr. 20, 1915 |
| 1,302,757 | Barber | May 6, 1919 |
| 1,460,928 | Tilden | July 3, 1923 |
| 1,714,814 | Plimpton | May 28, 1929 |
| 2,482,282 | Martin | Sept. 20, 1949 |
| 2,534,682 | Robishaw | Dec. 19, 1950 |
| 2,557,766 | Ronfeldt | June 19, 1951 |

FOREIGN PATENTS

| | | |
|---|---|---|
| 23,883 | Great Britain | Oct. 29, 1907 |
| 545,887 | Great Britain | June 17, 1942 |